Sept. 18, 1951  A. T. SCHEIWER  2,568,516
COUPLING
Filed May 19, 1948

INVENTOR.
ALBERT T. SCHEIWER
BY Floran D. Miller
Atty

Patented Sept. 18, 1951

2,568,516

UNITED STATES PATENT OFFICE 2,568,516

COUPLING

Albert T. Scheiwer, Erie, Pa.

Application May 19, 1948, Serial No. 27,951

9 Claims. (Cl. 284—19)

This invention relates generally to couplings and more particularly to quickly attachable snap action couplings wherein check valves are disposed.

Check valves heretofore devised for use in the male or female coupling members of a coupling have not been adaptable for use in vacuum lines because there is no pressure to close the check valves against atmospheric pressure. Also, much of the vacuum has been lost in the disconnection of these prior couplings and the ends thereof have not been sealed against dirt, dust and the like. These prior couplings have also required a sleeve on the female member to be moved with one hand upon the insertion of the male coupling member when a connection was to be made.

It is, accordingly, an object of my invention to overcome the above and other defects in present day coupling members and check valves therefor and it is more particularly an object of my invention to provide a coupling with check valves in the male member thereof particularly adapted for use in vacuum lines, which is simple in construction, economical in cost, economical in manufacture, and efficient in operation.

Another object of my invention is to provide novel means for sealing the male member of a coupling upon disconnection thereof.

Another object of my invention is to provide a coupling which minimizes the loss of fluid in the line upon connection and disconnection thereof.

Another object of my invention is to provide novel means in a female coupling member of a coupling for holding the camming members outwardly during disengagement thereof so that the male member may be connected to the female member by mere insertion.

Another object of my invention is to provide check valves in the male member of a coupling which is not dependent upon the pressure in a line for closing or sealing the coupling upon disengagement thereof.

Other objects of my invention will become evident from the following detailed description, taken in conjunction with the accompanying drawings, in which Fig. 1 is a side elevational view with one side thereof broken away on the center line of my novel coupling in a connected position;

Figure 1:
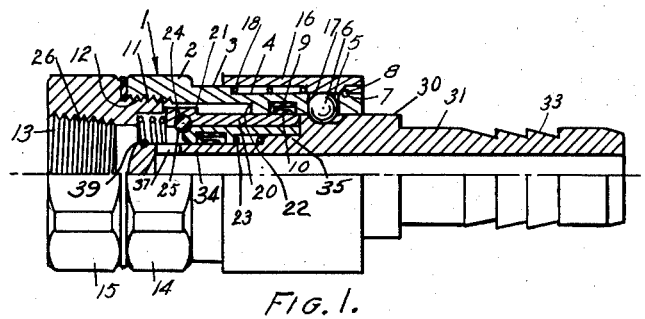
Figure 2:
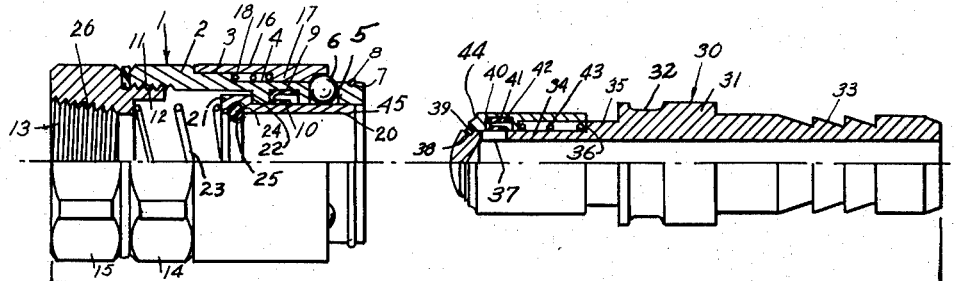
Fig. 2 is an exploded side elevational view with one side thereof broken away on the center line of my novel coupling in a disengaged position.

Referring now to the drawings, I show in Figs. 1 and 2 a female member 1 comprising a cylindrical shell 2 having stepped portions 3 and 4, ball retaining apertures 5 for retaining camming members or balls 6, a peripheral groove 7 for receiving a stop spring clip 8, an internal annular washer groove 9 for receiving a U-shaped washer 10, and an internally threaded portion 11 for threadably engaging the threaded end 12 of a connecting member 13. The cylindrical shell 2 and the connecting member 13 each have wrench engaging portions 14 and 15 respectively. A locking sleeve 16 having a camming portion 17 is telescopically disposed on the member 2 and the spring 18 urges the camming portion 17 of the sleeve 16 into engagement with the stop clip 8. A cylindrical member 20 is disposed internally and telescopically in the shell 2 and it has an outwardly extending enlarged portion 21 which is adapted to engage the shoulder 22 formed in the shell 2. A spring 23 urges the portion 21 into engagement with the shoulder 22 in the shell 2. The enlarged portion 21 of the member 20 has an annular internal groove 24 for receiving a sealing washer 25. The connecting member 13 has an internally threaded portion 26 adapted to be engaged with any suitable hose connection.

The male member 30 comprises a cylindrical member 31 having an annular groove 32, a serrated portion 33 for engagement to a hose, and a connecting portion 34 with an enlarged portion 35 forming a shoulder 36. The connecting portion 34 has laterally extending apertures 37 for the flow of fluid and an annular peripheral groove 38 for receiving a stop washer 39. A telescoping sleeve 40 is disposed on the connecting portion 34 of the male member 30 and it has an internal annular washer groove 41 for receiving a U-shaped washer 42 for sealingly engaging the apertures 37 in the connecting portion 34 of the male member 30. A spring 43 urges the sleeve 40 against the stop washer 39 as shown in Fig. 2. The sleeve 40 has an arcuate shaped annular grooved portion 44 for engagement with the washer 25 in the female member 1. The projecting portion 45 on the outer end of the sleeve member 20 in the female member 1 is spaced from the end of the shell 2.

In operation, my coupling shown in Figs. 1 and 2 is connected together as shown in Fig. 1 by merely inserting the sleeve 40 on connecting portion 34 of the male member 30 into the female member 1. Upon insertion of the connecting portion 34 of the male member 30 into the female member 1, the sleeve member 20 is forced rearwardly out of engagement with the balls 6 thereby permitting them to move into the groove 32 of the male member 30. The camming portion 17 of the locking sleeve 16 on the female member 1 locks the ball members 6 into engagement with the groove 32 on the male member 30. The sleeve 40 on the male member 30 engages washer 25 wherein it is forced out of sealing engagement with the washer 39 and the apertures 37 whereby fluid may flow between the male and female coupling members 1 and 20 respectively. Upon disconnection of the couplings, the locking sleeve 16 is pulled rearwardly against the force of the spring 18 so that the camming portion 17 thereof is out of engagement with the balls 6 thus permitting the withdrawal of the male member 30 from the female member 1. The sleeve 40 on the male member 30 is then automatically pushed forwardly by the spring 43 to close the laterally extending apertures 37 and sealingly engage the washer ring 39 as shown in Fig. 2. The spring-urged sleeve 20 in the female member 1 will move outwardly with the male member 30 whereby the balls 6 will be held outwardly in the path of the camming portion 17 of the locking sleeve 16 so that the connecting portion 34 of the male member 30 may be inserted into the female member 1 without any manual manipulation of the locking sleve 16.

Figure 3:
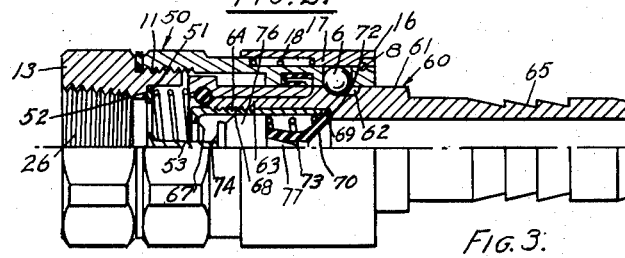
Fig. 3 is a side elevational view in locked position, with one side thereof broken away on the center line of a modified form of my coupling.
Figure 4:
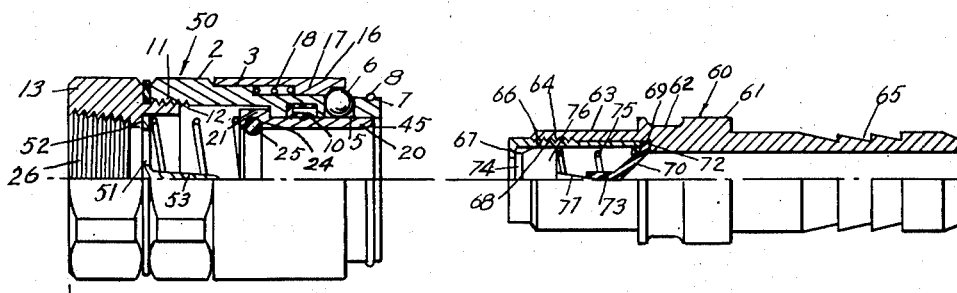
Fig. 4 is an exploded side elevational view of the coupling shown in Fig. 4 broken away on the center line thereof, and disengaged.

In Figs. 3 and 4, I show a modified form of the coupling shown in Figs. 1 and 2. The female member 50 is identical with the female member shown in Figs. 1 and 2 except that an apertured disc member 51 is disposed adjacent shoulder 52 formed in the member 13. The disc member 51 has an axially, outwardly extending abutting portion 53. The male member 60 comprises a cylindrical member 61 having a peripheral groove 62, a connecting portion 63 threaded internally at 64 and a serrated portion 65 for engagement with a hose or the like. A cylindrically shaped sleeve 66 flanged inwardly at 67 and having an externally threaded portion 68 is threadably engaged with the threaded portion 64 of the connecting portion 63 of the male member 60 and it engages the outwardly flanged portion 69 of a flexible conical shaped member 70 which is held between shoulder 72 formed in the male member 60 and the sleeve 66 as shown in Fig. 4. The member 70 has a split outwardly projecting flattened portion 73 so that fluid may pass through from the base end of the member 70 but not from the apex end thereof. A flat, disc shaped member 74 is urged into engagement with the inwardly directed, flanged portion 67 of the male member 60 by spring 75. The member 74 has radially extending ribs 76 and an axially extending pointed portion 77 for passing through the split portion 73 of the flexible member 70 to open the split portion of the flexible member 70 to the passage of fluid in either direction.

In the operation of my coupling shown in Figs. 3 and 4, the connecting portion 63 of the male member 60 is disposed in the female member 50 wherein the sleeve 20 is forced out of engagement with the balls 6 and they engage the groove 62 in the male member 60 and are locked therein by the camming portion 17 of the locking sleeve 16. The end of the connecting portion 63 of the male member 60 sealingly engages the washer 25 in the female member 50. The projecting portion 53 on the disc 51 engages the member 74 and forces it against the force of the spring 75 whereby the pointed member 77 opens the split portion 73 of the flexible member 70 to permit the flow of fluid through the male and female members 60 and 50 respectively. Upon disconnection, the sleeve 16 is forced against the spring 18 to a position where the camming portion 17 thereof clears the balls 6 wherein the male member 60 is pulled away from the female member 50. As the male member 60 moves outwardly, the spring-urged sleeve 20 will follow it so that the ball members 6 will be held outwardly in the path of the camming portion 17 of the sleeve 16. The spring 75 will also force the member 74 into engagement with the inwardly directed flange 67 on the connecting portion 66 of the male member 60 thereby moving the pointed member 77 from the split portion 73 of the member 70 to seal the male member 60.

It will be evident from the foregoing description that I have provided a novel coupling with check valves which are positive in operation no matter what the pressure is in the line and one which is particularly adaptable for a vacuum line.

Various changes may be made in the specific embodiment of my invention without departing from the spirit thereof or from the scope of the appended claims.

What I claim is:

1. A coupling comprising a female member, camming members carried by said female member, a spring-urged camming sleeve for engaging said camming members, a sleeve telescopically disposed internally of said female member adapted to hold said camming members outwardly in the path of said camming sleeve when said female member is disengaged, a washer in said sleeve, a male member having an apertured connecting portion adapted to sealingly engage the washer in said female member and for moving said internal sleeve out of engagement with the camming members in said female member, having a peripheral groove for locking engagement with the camming members of said female member, and a telescopic sleeve movable on the connecting portion of said male member for sealingly engaging the aperture in said connecting portion of said male member upon disconnection thereof, said washer in the sleeve in said female member being engageable by said sleeve on said connecting portion of said male member upon a predetermined longitudinal movement of said sleeve in said female member to move said sleeve on said male member out of sealing engagement with the aperture therein whereby fluid flows from said male member to said female member and vice versa.

2. A coupling comprising a female member, camming members carried by said female member, an external spring-urged camming sleeve for engaging said camming members, an internal, telescopically disposed sleeve for engaging said camming members when said female member is disengaged to hold the camming members in the path of said camming sleeve, a washer disposed internally of said inner sleeve, a male member having an apertured connecting portion with a peripheral groove, adapted to sealingly engage the washer in said sleeve and move said sleeve longitudinally out of engagement with said camming members whereby said camming members lockingly engage the peripheral groove on said male member upon connection of said male and female members, and a spring urged telescopic sleeve movable on the connecting portion of said male member for sealingly engaging the aperture in said connecting portion of said male member upon disconnection thereof, said washer in the sleeve in said female member being engageable by said sleeve on said connecting portion of said male member to move said sleeve on said male member out of sealing engagement with the aperture therein after said sleeve in said female member is moved out of engagement with said camming members whereby fluid flows from said male member to said female member and vice versa.

3. A coupling comprising a female member, an annular sealing washer therein, a male member having laterally extending apertures, a spring-urged outer sleeve on said male member adapted to sealingly engage the laterally extending apertures therein upon disengagement, said sleeve being moved longitudinally by the annular washer in said female member upon connection of said male and female members, and means for locking said male and female members together.

4. A coupling comprising a female member, an inner spring urged longitudinally movable sleeve in said female member, an annular washer disposed in said inner sleeve, camming members carried by said female member, an outer spring-urged camming sleeve for lockingly engaging said camming members, said inner sleeve holding said camming members outwardly in the path of said outer camming sleeve upon disengagement of said female member, a male member having a peripheral groove for engagement by the camming members of said female member upon connection of said male and female members together, and a connecting portion with a laterally extending portion, a telescoping sleeve on the connecting portion of said male member for sealingly engaging the laterally extending apertures therein upon disengagement thereof, said sleeve being movable longitudinally by the annular washer in said female member upon engagement of said male and female members to unseal the laterally extending apertures in said male member and said male member moving said inner sleeve in said female member longitudinally out of engagement with said camming members whereby they may engage the peripheral groove of said male member upon connection of said male and female members.

5. A coupling comprising a female member, a stop member in said female member, a male member, a spring-urged member for sealingly engaging the end of said male member when disengaged, a pointed member movable with said spring-urged member, a split yieldable member normally closed to the passage of fluid in one direction in said male member adapted to be opened by said pointed member, said stop member in said female member moving said spring-urged member to an open position and said pointed member into the split portion of said yieldable member when said male and female members are connected together and means for connecting said male and female members together.

6. A coupling as set forth in claim 5 wherein a sleeve is provided in said female member whereby said male and female members may be connected together by mere insertion of the male member into the female member.

7. A coupling comprising a female member, a spring urged longitudinally movable sleeve in said female member, camming members carried by said female member, a male member having a peripheral groove and a connecting portion with laterally extending apertures, a movable sleeve on the connecting portion of said male member adapted to sealingly engage the apertures in the connecting portion of said male member upon disengagement, means in the sleeve in said female member for moving said sleeve on said male member longitudinally out of sealing engagement with the apertures in said male member when said male and female members are connected together, and a camming sleeve on said female member to urge said camming members into engagement with the peripheral groove on said male member to lock said male and female members together, said sleeve in said female member being adapted to engage the inner side of said camming members to hold them outwardly in the path of said camming sleeve upon disengagement of said male and female members whereby said male and female members may be connected together by mere insertion of said connecting portion of said male member into said female member.

8. A coupling comprising a male member having a connecting portion with an inwardly directed end flange and laterally extending apertures, a split flexible member in said male member having a normally closed aperture for closing said male member to the flow of fluid in one direction, a movable member in said male member for opening said aperture in said yieldable member to the flow of fluid, a female member, means in said female member for engaging the movable member in said male member upon connection of said male and female members to open said yieldable member to the flow of fluid, and means for connecting said male and female members together.

9. A coupling comprising a female member, an annular washer in said female member, a male member having a connecting portion, a conical shaped, yieldable member having an outwardly extending split portion disposed in said male member, said split portion being normally closed to the flow of fluid in one direction, a movable pointed member in said female member adapted to open the split portion of said yieldable member to the flow of fluid, and means in said female member for moving said pointed member into engagement with the split portion of said yieldable member upon connection of said male and female members together, and means for connecting said male and female members together.

ALBERT T. SCHEIWER.

REFERENCES CITED

The following references are of record in the file of this patent:

UNITED STATES PATENTS

| Number | Name | Date |
|---|---|---|
| 1,364,147 | Spahr | Jan. 4, 1921 |
| 2,111,956 | Baldwin | Mar. 22, 1938 |
| 2,135,221 | Scheiwer | Nov. 1, 1938 |
| 2,279,146 | Schneller | Apr. 7, 1942 |
| 2,297,548 | Fox et al. | Sept. 29, 1942 |
| 2,397,342 | Farrell | Mar. 26, 1946 |
| 2,412,685 | Hoffman et al. | Dec. 17, 1946 |
| 2,428,637 | Scheiwer | Oct. 7, 1947 |